United States Patent
Neyer

(10) Patent No.: US 11,459,981 B2
(45) Date of Patent: Oct. 4, 2022

(54) PRE-HEATING DEVICE

(71) Applicant: Stahlotec GmbH, Hagen a.T.W. (DE)

(72) Inventor: Christian Neyer, Osnabrück (DE)

(73) Assignee: Stahlotec GmbH, Hagen a.T.W. (DE)

( * ) Notice: Subject to any disclaimer, the term of this patent is extended or adjusted under 35 U.S.C. 154(b) by 111 days.

(21) Appl. No.: 16/977,847

(22) PCT Filed: Mar. 6, 2019

(86) PCT No.: PCT/EP2019/055620
§ 371 (c)(1),
(2) Date: Sep. 3, 2020

(87) PCT Pub. No.: WO2019/170780
PCT Pub. Date: Sep. 12, 2019

(65) Prior Publication Data
US 2021/0025356 A1    Jan. 28, 2021

(30) Foreign Application Priority Data
Mar. 9, 2018    (DE) .......................... 202018101346.7

(51) Int. Cl.
*F02M 31/16*    (2006.01)
*F02M 31/10*    (2006.01)
(Continued)

(52) U.S. Cl.
CPC ......... *F02M 31/16* (2013.01); *B63B 17/0027* (2013.01); *F02M 31/10* (2013.01);
(Continued)

(58) Field of Classification Search
CPC ...... F02M 31/16; F02M 31/10; F02M 31/102; F02M 31/125; B63B 17/0027;
(Continued)

(56) References Cited

U.S. PATENT DOCUMENTS 5,174,266 A * 12/1992 Evdokimo ............. F02M 31/20
                                                              123/557
2016/0290733 A1    10/2016 Noishiki

FOREIGN PATENT DOCUMENTS

AT          7373 U1      2/2005
DE      3441384 A1      5/1986
(Continued)

OTHER PUBLICATIONS

WIPO, International Search Report (on priority application), dated May 28, 2019.

*Primary Examiner* — Jacob M Amick
(74) *Attorney, Agent, or Firm* — Laurence P. Colton; Smith Tempel Blaha LLC

(57) ABSTRACT

A preheating device for preheating the fuel of an internal combustion engine with a heating medium has a fuel transport device with a fuel inlet and a fuel outlet, and has a fuel transport channel connecting the fuel inlet and the fuel outlet. The preheating device also has a heating medium transport device with a heating medium inlet and a heating medium outlet, as well as a heating medium transport channel connecting the heating medium inlet and the heating medium outlet and/or at least one heating element. The fuel transport device and the heating medium transport device and/or the at least one heating element are in thermal contact with each other and thus form a heat exchanger via which a fuel transported in the fuel transport device can be heated by a heating medium transported in the heating medium transport device and/or by the at least one heating element.

17 Claims, 6 Drawing Sheets

(51) Int. Cl.
*F02M 31/12* (2006.01)
*F28D 9/00* (2006.01)
*F28F 3/08* (2006.01)
*F02M 31/125* (2006.01)
*B63B 17/00* (2006.01)
*F28D 21/00* (2006.01)
*F28F 21/08* (2006.01)

(52) U.S. Cl.
CPC ........ *F02M 31/102* (2013.01); *F02M 31/125* (2013.01); *F28D 9/0037* (2013.01); *F28D 2021/0087* (2013.01); *F28F 3/08* (2013.01); *F28F 21/085* (2013.01)

(58) Field of Classification Search
CPC .. F28D 9/0037; F28D 2021/0087; F28F 3/08; F28F 21/085
See application file for complete search history.

(56) References Cited

FOREIGN PATENT DOCUMENTS

| EP | 0094885 A1 | 11/1983 |
| EP | 2462334 B1 | 3/2015 |

\* cited by examiner

PRE-HEATING DEVICE

CROSS REFERENCE TO RELATED APPLICATIONS

This application is the US National Phase of and claims the benefit of and priority on International Application No. PCT/EP2019/055620 having a filing date of 6 Mar. 2019, which claims priority on and the benefit of German Patent Application No. 20 2018 101 346.7 having a filing date of 9 Mar. 2018.

BACKGROUND OF THE INVENTION

Technical Field

The invention relates to a preheating device for preheating fuel of an internal combustion engine with a heating medium.

Prior Art

A corresponding preheating device is known from EP 2 462 334 B1, by way of example.

In the known device, a fuel is preheated by being passed through a heat exchanger. This heat exchanger is constructed in the form of a tube which has a shell through which the fuel is conducted from a fuel inlet to a fuel outlet. Towards the inside of the tube, this shell constitutes a heat exchanger surface which comes into contact with a heating medium flowing through the tube in the axial direction. In this way, the fuel flowing in the tube shell is heated.

The known device, however, has the disadvantage that the required heating of the fuel in the manner described is insufficient. Since the warmer the fuel is, the better it burns, it is crucial that the fuel is heated as effectively as possible by the heat exchange process. Another disadvantage of the known construction is that the tube shell contains components which have to be welded together. If leaks occur at the welding points in the course of operation, it is possible that fuel and heating medium will be mixed with each other. This can lead to a downstream engine being operated with a fuel/water mixture, for example, and thus possibly being damaged.

BRIEF SUMMARY OF THE INVENTION

The object of the present invention is therefore to specify a device of the type mentioned at the outset by means of which the fuel can be heated as efficiently as possible and by means of which the disadvantages described can be avoided.

This object is achieved by a preheating device for preheating the fuel of an internal combustion engine with a heating medium, comprising a fuel transport device having a fuel inlet and a fuel outlet, and having a fuel transport channel connecting the fuel inlet and the fuel outlet, a heating medium transport device having a heating medium inlet and a heating medium outlet, as well as a heating medium transport channel connecting the heating medium inlet and the heating medium outlet, and/or at least one heating element, wherein the fuel transport device and the heating medium transport device and/or the at least one heating element are in thermal contact with each other and thus form a heat exchanger via which a fuel transported in the fuel transport device can be heated by a heating medium transported in the heating medium transport device, and/or by the at least one heating element, characterized in that the heating medium transport device and the fuel transport device are arranged in a metallic block, wherein the fuel transport channel and the heating medium transport channel are each designed to be meandering in the block, at least in sections, and in particular separated from each other in terms of flow, and/or in that the fuel transport device is arranged in a metallic block, wherein the fuel transport channel is designed to be at least partially meandering and the at least one heating element is arranged in or on at least one cover plate of the metallic block. Advantageous embodiments are found in the dependent claims.

The preheating device according to the invention has a fuel transport device with a fuel inlet and a fuel outlet. The fuel inlet and the fuel outlet in this case are connected via a fuel transport channel. The preheating device further comprises a heating medium transport device which has a heating medium inlet and a heating medium outlet, wherein a heating medium transport channel connecting the heating medium inlet and the heating medium outlet is also provided, and/or at least one heating element. The fuel transport device and the heating medium transport device and/or the at least one heating element are in thermal contact with each other and thus form a heat exchanger. Via this heat exchanger, a fuel transported in the fuel transport device can be heated by a heating medium transported in the heating medium transport device and/or by the at least one heating element.

According to the invention it is now provided that the heating medium transport device and the fuel transport device are arranged in a—preferably monolithic—metallic block. In this case, the fuel transport channel and the heating medium transport channel are each designed to be meandering in the block at least in sections, and in particular separated from each other in terms of flow. Alternatively or in addition, the invention provides that the fuel transport device is arranged in a metallic block, wherein the fuel transport channel is designed to be meandering at least in sections, and the at least one heating element is arranged in or on at least one cover plate of the metallic block.

The preheating device designed in this way has a number of advantages. On the one hand, the meandering routing of both fuel and heating medium results in a longer residence time in the heat exchanger. Due to the longer residence time, the heating medium can naturally transfer considerably more heat to the fuel, such that the fuel is heated substantially more efficiently. Particularly due to the fact that, according to the invention, both the fuel transport device and the heating medium transport device are accommodated in a metallic block, the heat transfer between the heating medium transport channel and the fuel transport channel is particularly as a result of the good thermal conductivity properties of metals. In addition to the supply of heat via a heat transport device—or even as an alternative to this—the heat can be supplied via a heating element. As such, when an increased heating requirement exists, the heating element can supply additional heat to the preheating device—or the sole supply of heat to the preheating device takes place via one or more heating elements. In addition, in the preheating device according to the invention, a particularly large heat exchange surface is made available, which additionally improves the heating. The heat transfer is particularly effective if the block is monolithic, since there are no interfaces with an insulating effect between the heat transfer channel and/or the heating element and the fuel transfer channel. In this way, there is always a part of the metallic block between the two channels and/or between the heating element and at least one of the channels, wherein this part forms the heat exchange surface. This results in a further advantage: specifically, in this way it is also not possible for any connections such as welded connections, screw connections or the like to become leaky or cause leaks. In this way, fuel and heating medium cannot be mixed during operation of the preheating device.

Compared to the prior art, a preheating device designed in this way is able to heat the fuel much better, which significantly reduces the fuel consumption of a downstream engine. Especially when used in the field of ship engines, where it is not uncommon for 5,000 liters of diesel to be consumed per day, this option creates considerable savings potential compared to previous solutions.

According to a particularly preferred embodiment of the preheating device according to the invention, it is provided that the block has copper or consists of copper. It has been shown that the fuel, which can be diesel, for example, is catalytically prepared through contact with a copper surface. As a result, it has been shown that fewer nitrogen oxides are produced in the exhaust gases in the later combustion process. Measurements have shown that in this way the NOx content in the exhaust gas can be reduced considerably.

According to another preferred embodiment of the present invention, the fuel transport channel is incorporated into, milled into, or introduced into the metal block. It is thus possible, for example, without further components, that is to say in a component-saving manner, to process an unfinished block made of metal accordingly and, for example, to drill the inlet and outlet into the end faces of the block. If, for example, a preheating device is used in which the heat is supplied solely by heating elements, the fuel transport channel can not only be introduced in one plane, but from two opposite sides of the block in two planes, which increases the possible heat supply and/or can make the structure of the preheating device more compact.

In a particularly preferred embodiment, the fuel channel is covered by at least one cover plate. Since in this embodiment the fuel transport channel is open to the outside of the block, one or, depending on the design, both open sides can then be covered with a cover plate. The respective cover plates are then preferably fixed to the block, in particular by welding.

It is of particular advantage if there is as good a flow as possible through all areas of the transport channel. Particularly turbulent flows are advantageous in this case. According to an advantageous embodiment it is therefore provided that flow swirling means are arranged in the fuel transport channel. These ensure that the medium entering the transport channel flows through the respective transport channel in a turbulent manner. For example, steps and/or projections within the transport channel can be formed as flow swirling means. Especially when the block and the transport channel located therein are produced, for example by milling, corresponding projections or steps can be formed through corresponding recesses in the material.

According to a further preferred embodiment of the present invention, it can be provided that the fuel transport channel is arranged on a first side of the block, and that the heating medium transport channel is arranged on a second side of the block, in particular opposite the first side. In this way, a particularly compact preheating device can be formed, in which the two meandering transport channels are arranged in flat superimposition. For this purpose, it can be provided in particular that the fuel transport channel is incorporated into, milled into, or introduced into the first side. In the same way, the heating medium transport channel can also be incorporated into, milled into, or introduced into the second side. Here, too, it is possible to machine an unfinished metal block without additional components, that is to say in a component-saving manner, by milling the channels into both sides and drilling the inlets and outlets— for example, into the end faces of the block.

Since the heating medium transport channel and the fuel transport channel are also open to the outside of the block in this embodiment, each of the two can then be covered with a cover plate. The respective cover plates are then preferably fixed to the block, in particular by welding.

It is of particular advantage if there is as good a flow as possible through all areas of the transport channels. Particularly turbulent flows are advantageous in this case. According to an advantageous embodiment, it is therefore provided that flow swirling means are arranged in the fuel transport channel and/or in the heating medium transport channel. These ensure that the medium entering each of the transport channels flows through the respective transport channel in a turbulent manner. Here, too, steps and/or projections within the transport channels can be designed as flow swirling means.

It has proven to be particularly advantageous if the at least one heating element is arranged on the cover plate of the fuel transport channel. This is for heating the fuel. By arranging the heating element on the cover plate of the fuel transport channel, the material thickness that separates the heat supplier from the heat consumer can be kept low, which improves the heat transfer.

It has also proven particularly advantageous that in each case at least one heating element is arranged on the surface of both cover plates or is introduced into the surface. If heating elements will provide the sole heat supply, the transfer area is increased if both cover plates are equipped with heating elements; this is particularly advantageous if the fuel transport channel is also routed in two planes. However, configuring these on both sides also offers advantages to support a further heating medium.

It has been found to be advantageous if the outer contour of the block has an approximately cuboid shape. In this way, a whole series of preheating devices according to the invention can be produced from a larger raw material with relatively little waste.

The invention also relates to a vehicle in which a preheating device according to the invention is used. Such a vehicle therefore preferably has an engine, a fuel tank, fuel that is located in the fuel tank, a fuel supply system that supplies the fuel to the engine, and a preheating device connected between the fuel tank and the engine, as described above. According to the invention, the fuel inlet of the preheating device is connected to a line section leading to the fuel tank, and the fuel outlet of the preheating device is connected to a line section leading to the engine. A heating medium is circulated through the heating medium transport device and/or at least one heating element is operated.

The heating medium can be any type of fluid, for example water. The fuel can be any fluid fuel. According to a preferred embodiment it is provided that the fuel is diesel fuel.

In order to be independent of existing heat sources in the vehicle, it has proven advantageous to operate the at least one heating element electrically. The energy source can be switched on or off easily and, in particular, quickly.

Of course, the invention is suitable for all types of vehicles in which internal combustion engines are present. According to a particularly preferred embodiment, the vehicle according to the invention is a watercraft, in particular a ship.

BRIEF DESCRIPTION OF THE DRAWINGS

The invention is explained in more detail below with reference to the embodiment shown in the figures.

DETAILED DESCRIPTION OF PREFERRED EMBODIMENTS

Figure 1:
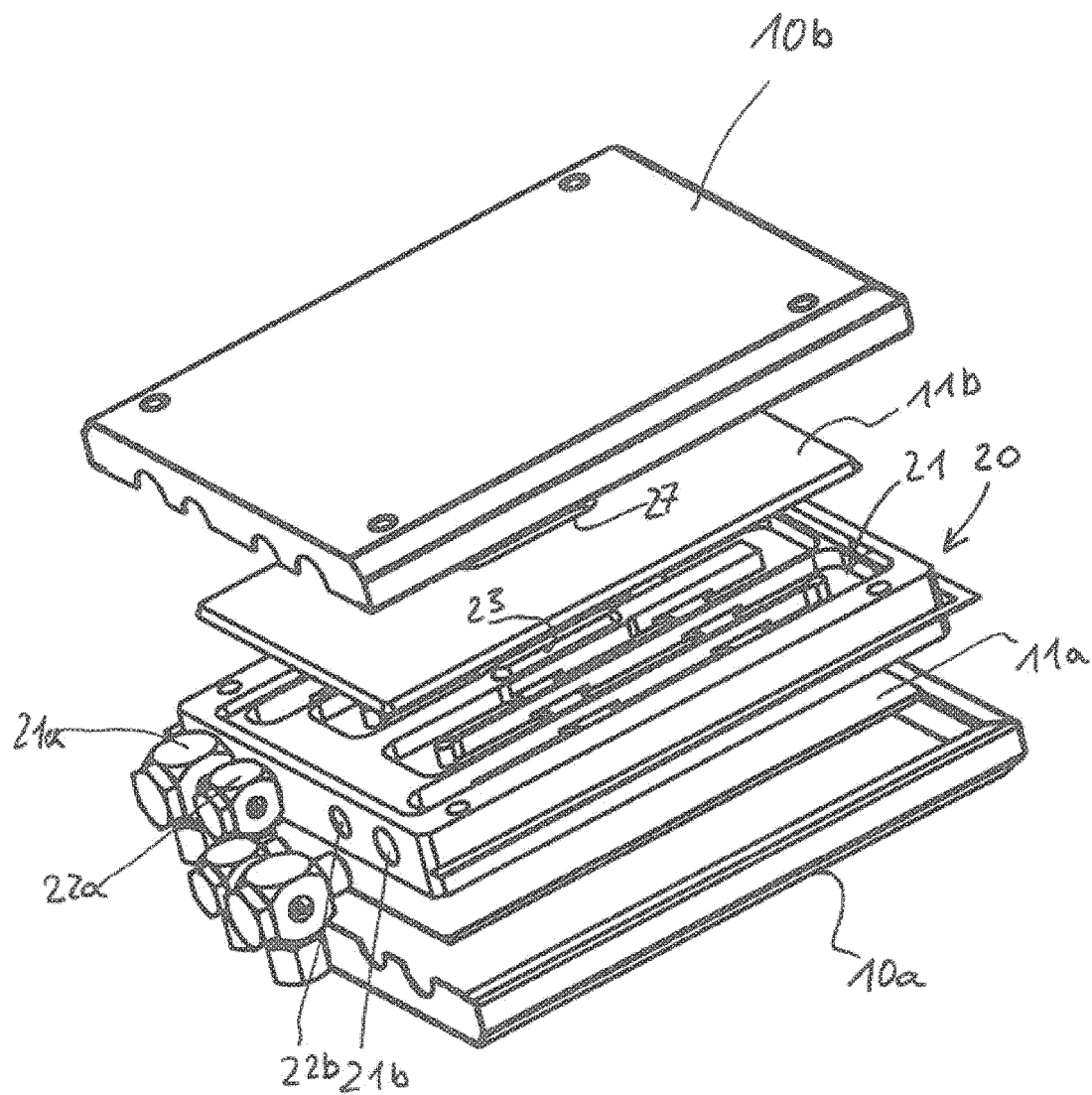
FIG. 1 shows a perspective exploded view of a preheating device according to the invention.
Figure 3:
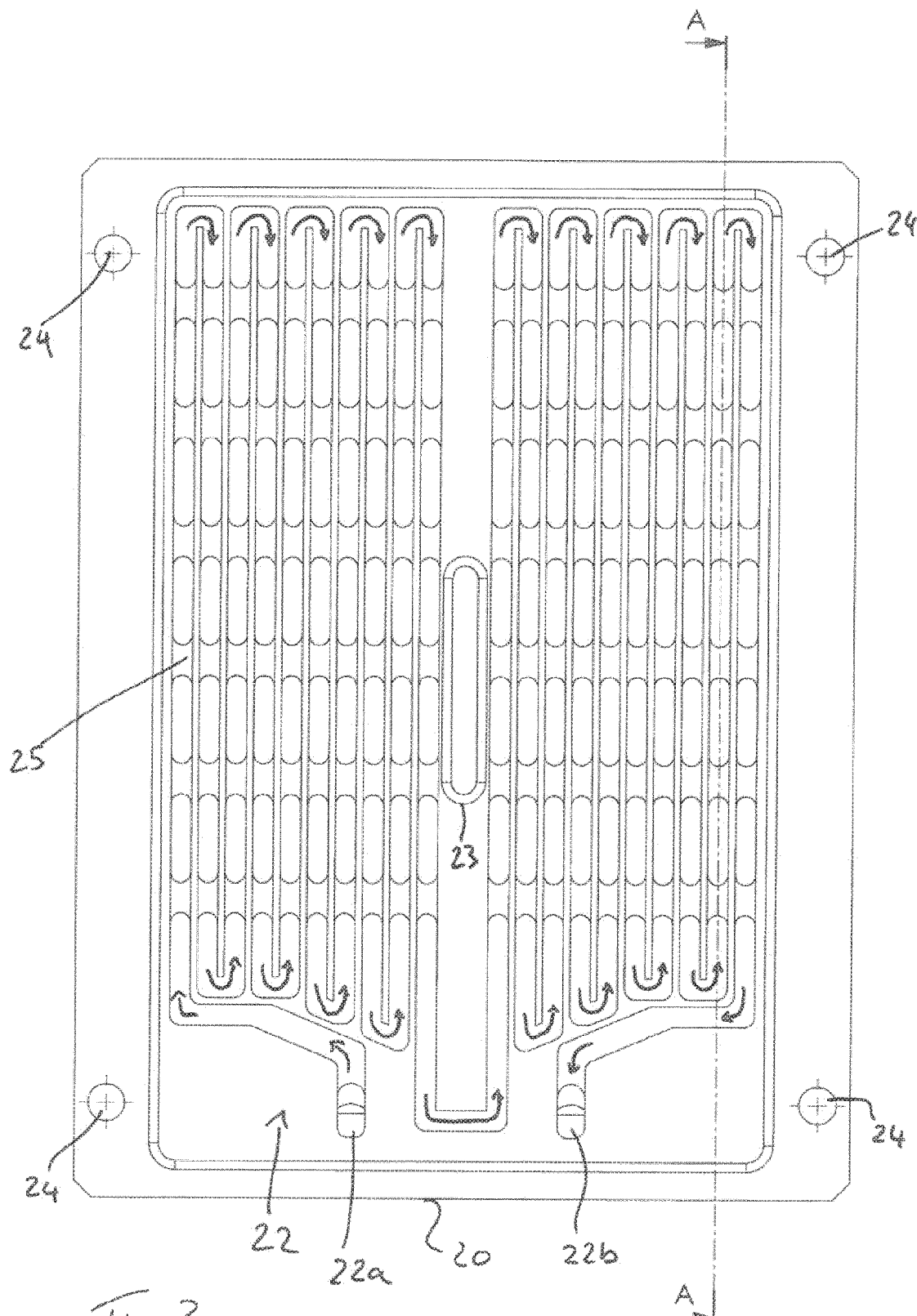
FIG. 3 shows a plan view of the block comprised by the preheating device according to the invention, on the side of the fuel transport channel.

As FIG. 1 shows, the preheating device 1 has a block 20 in its core, which in this embodiment is cuboid. A heating medium transport device 21 in the form of a channel is introduced into the upper part of the block 20 with the greatest area of the cuboid. This heating medium transport device 21 is designed in a meandering shape and extends from a heating medium inlet 21a, attached on the end face, to the heating medium outlet 21b, which is preferably attached on the same surface. The inlet and the outlet are connected to the heat transport device 21 by bores in the end face of the block 20. The fuel transport device 22, which is described in more detail below with reference to FIG. 3, is introduced into the underside which is opposite the top side of the block 20 which carries the heat transport device 21, and which is not shown here. The fuel inlet 22a and the fuel outlet 22b are also arranged on the end face on which the heating medium inlet 21a and heating medium outlet 21b are also arranged. The inlets and outlets can also be at different points and/or on narrow sides of the block 20. The heat transfer device 21 and fuel transport device 22, which are introduced into the block 20, which is preferably made of metal, are transport channels 25, 26 which are open toward the outside. The transport channels 25, 26 are each closed by cover plates 11a, 11b, respectively which preferably have an elongated hole 27 or elongated depression in the center of the plate 11a, 11b. This slot 27 and/or the depression is/are placed, along with the cover plate 11a, 11b, over a preferably complementary projection 23 with a positive fit, wherein the guide web 23 in the example shown is preferably centrally located on the open side of the block 20, raised on the central web there. In addition, in this embodiment the edge of the surface with the transport channels 25, 26 introduced therein is raised, such that the cover plate 11a, 11b is enclosed. The inserted cover plates 11a, 11b can be fixed to the block 20 by means of screws, rivets or by welding or soldering. Since both the fuel and the heating medium are pumped through the transport device 21, 22 under pressure, the connection between the cover plate 11a, 11b must be pressure-resistant.

Furthermore, a housing cover 10a, 10b can be arranged over the cover plates 11a, 11b, and can be fastened to the block 20 with screws, or is likewise welded on. The housing cover 10a, 10b protects the preheating device 1 and serves as a surrounding housing, and can have an insulating effect in order to keep the heat loss in the preheating device 1 caused by thermal radiation to a minimum.

Figure 2:
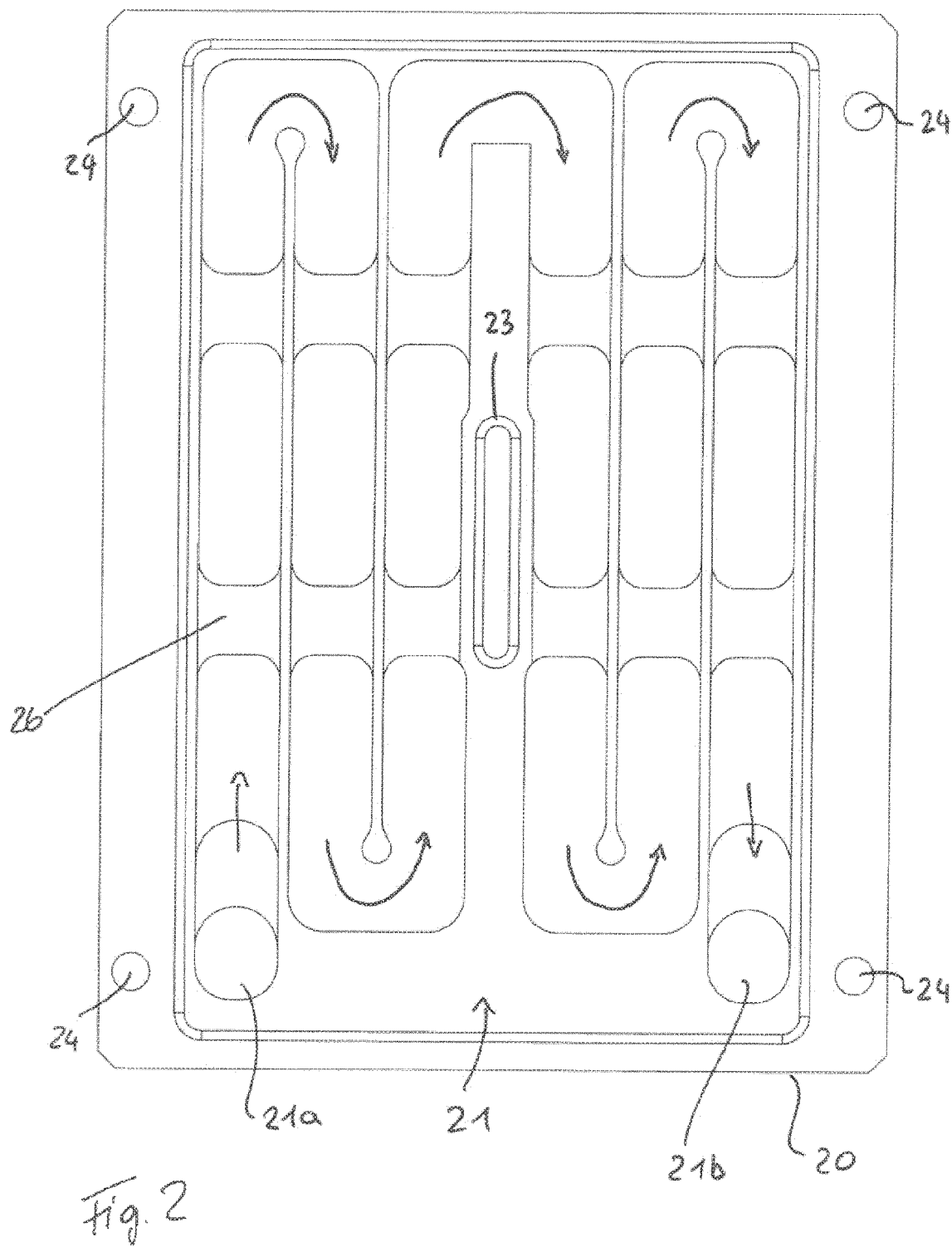
FIG. 2 shows a plan view of the block comprised by the preheating device according to the invention, on the side of the heating medium transport channel.

The plan view of FIG. 2 shows the block 20 comprised by the preheating device 1, on the side of the heating medium transport channel 26. At the bottom left in the block 20, part of the heating medium inlet 21a is shown. From there, the heating medium transport channel 26 leads to the right with meanders, and ends at the heating medium outlet 21b. In the center, a somewhat stronger web is preferably left to stabilize the block 20. On this, for example, the centering web 23 for the cover plate 11b also rises. Four bores 24 are preferably made in the edge of the block 20, which is preferably designed to be raised relative to the region of the heat transport device 21. Threads can be cut into the bores 24, and screws with which the housing cover 10b is fastened to the block 20 can engage in these threads. As an alternative to this, the bores 24 can also pass through the block 20, such that the two housing covers 10a, 10b are screwed together. Since the block 20 is intended to transfer the heat of the heating medium to the fuel, the block should be formed from a thermally conductive material. The block is preferably made of metal. Particularly preferably, the block 20 is made containing copper or is made entirely of copper.

FIG. 3 shows a plan view of the block 20 comprised by the preheating device 1 according to the invention, on the side of the fuel transport channel 25. The fuel transport channel 25 runs in meanders from the fuel inlet 22a to the fuel outlet 22b. The fuel transport channel 25 in this case preferably has a smaller cross-section than the heating medium transport channel 26, as a result of which the fuel transport channel 25 has a greater surface area and, as a result, the heat absorption of the fuel conveyed therein is improved. A wider web with the raised web 23 for the cover plate 11b is also arranged in the center on this side. The edge of the block 20, which is also preferably raised here, likewise comprises the fastening bores 24.

Figure 4:
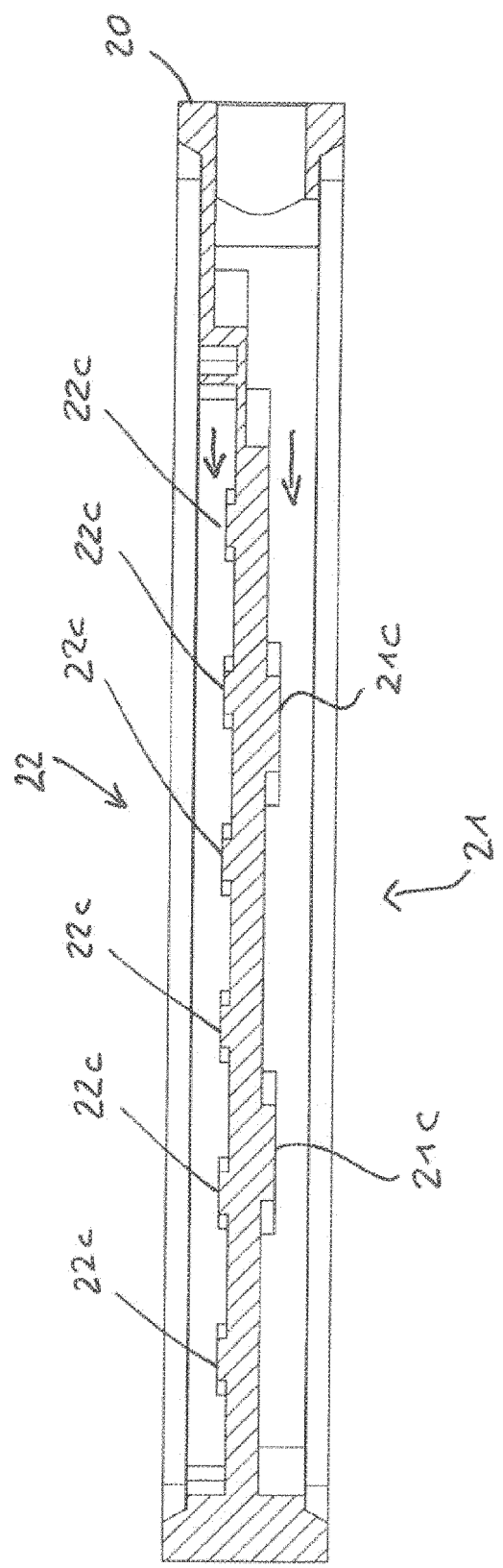
FIG. 4 shows a view of a section through the block comprised by the preheating device according to the invention, along the line A-A in FIG. 3.

FIG. 4 shows a sectional view through the block 20 comprised by the preheating device according to the invention, along the line A-A in FIG. 3. The section shows the fuel transport device 22 at the top and the heating medium transport device 21 at the bottom. The section passes through a straight part of each of the transport channels 25, 26; the heating medium inlet 21a/outlet 21b are shown on the lower right. Raised flow swirling means 21c, 22c are incorporated at the base of the channels, that is to say towards the center of the block 20, and ensure that the heating means and/or the fuel swirl. As a result, they produce a mixing of the heating means and/or the fuel, such that the temperature and therefore the heat transfer are distributed as evenly as possible.

Both the heating medium and the fuel can dwell long enough in this preheating device 1 to ensure the required fuel temperature.

Figure 5:
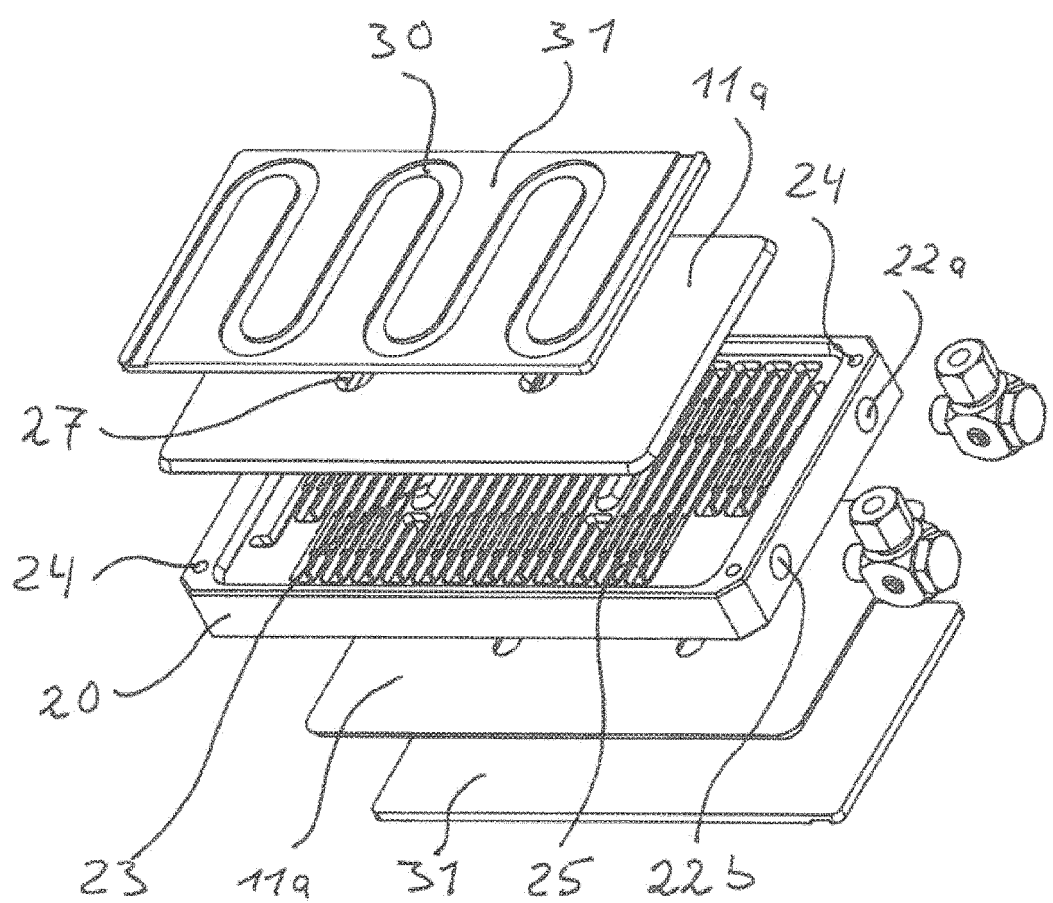
FIG. 5 shows a perspective exploded view of another preheating device according to the invention.

FIG. 5 shows a further embodiment of a preheating device 1 according to the invention, in an exploded view. In this preheating device 1, the heat is supplied via heating elements 30. The open fuel channels 25 are incorporated into the two large surfaces of the cuboid block 20 with a meandering form. The fuel channel 25 is configured in this case in such a manner that the inlet 22a and the outlet 22b of the fuel transport device 22 are arranged on a narrow side. This has the advantage that when the preheating device 1 is installed later in an existing fuel transport system, the lines do not have to be relocated too much. As already stated above, guide webs 23 are situated on the inside between the meandering fuel channel 25; the elongated holes of the cover plates 11a are placed over these in order to enable closing the transport channel 25 with a positive fit. In this embodiment, a carrier plate 31 which carries a heating element 30 in a dimensionally stable manner is arranged on the outside of each cover plate 11a. It is also conceivable to arrange the heating element 30 on only one side. It is also possible to arrange the heating element 30 directly on a cover plate 11a or to introduce recesses into the cover plate 11a, in which the heating elements 30 are arranged. The cover plate 11a is covered by an insulating housing cover 10a (not shown here) to prevent heat losses from the preheating device 1 to the surroundings.

Figure 6:
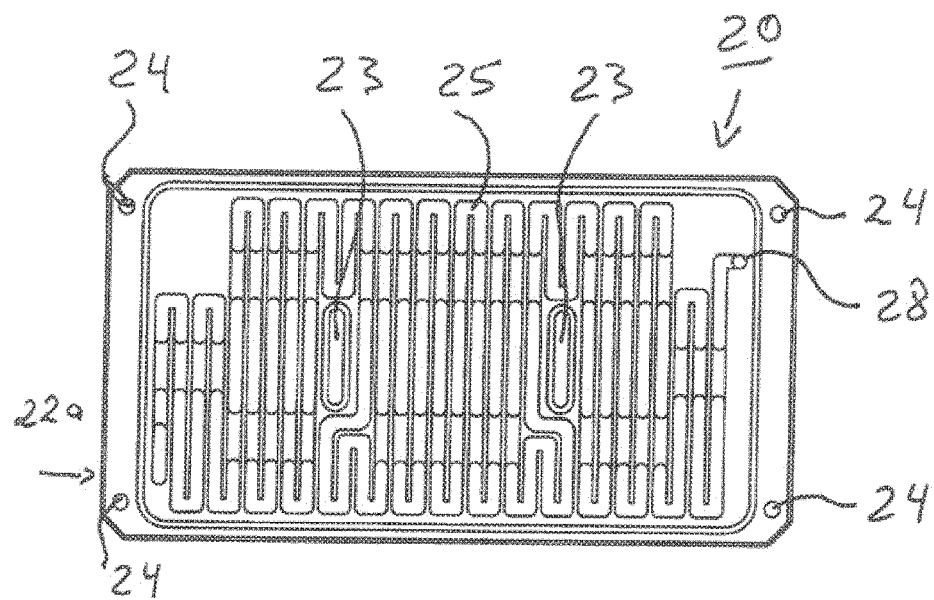
FIG. 6 shows a plan view of the block comprised by the preheating device according to the invention in FIG. 5, on a side of the fuel transport channel.

In the plan view shown in FIG. 6, the meandering of the fuel channel 25 can be clearly seen. The "inlet plane" is selected here as an example. The fuel enters the fuel channel 25 via the fuel inlet 22a, which cannot be seen from the top view, and is conveyed from left to right in the figure. At the right end, the fuel is conveyed into a passage 28 through which it is conveyed from the "inlet plane" to the "outlet plane" which, from this perspective, is below. There, the fuel is then conveyed from right to left and guided out of the preheating device 1 again through the fuel outlet 22b (not shown). By conveying the fuel in two planes, the heat exchange surface area is practically doubled without changing the base area of the preheating device 1.

The described embodiments do not constitute a restriction of the subject matter according to the invention. It is also conceivable to equip a preheating exchanger 1, as described in FIGS. 1 to 4, with a heating element, as described in FIG. 5, on the fuel-bearing side in order to enable additional heat input. It is also conceivable to equip both of the large surfaces with heating elements 30 or, on the other hand, to equip a preheating device 1, as described in FIG. 5, with only one heating element. A preheating device 1 according to the invention also comprises a configuration in which two or more heating elements are arranged on a cover plate.

The invention claimed is:

1. A preheating device (1) for preheating fuel of an internal combustion engine with a heating medium, comprising:
    a fuel transport device (22) having a fuel inlet (22a) and a fuel outlet (22b), and having a fuel transport channel (25) connecting the fuel inlet (22a) and the fuel outlet (22b);
    a heating medium transport device (21) having a heating medium inlet (21a) and a heating medium outlet (21b), as well as a heating medium transport channel (26) connecting the heating medium inlet (21a) and the heating medium outlet (21b);
    and/or at least one heating element (31),
    wherein the fuel transport device (22) and the heating medium transport device (21) and/or the at least one heating element (31) are in thermal contact with each other and thus form a heat exchanger via which a fuel transported in the fuel transport device (22) can be heated by a heating medium transported in the heating medium transport device (21), and/or by the at least one heating element (31),
    wherein the heating medium transport device (21) and the fuel transport device (22) are arranged in a metallic block (20),
    wherein the fuel transport channel (25) and the heating medium transport channel (26) are each designed to be meandering in the block (20), at least in sections, and in particular separated from each other in terms of flow, and/or in that the fuel transport device (22) is arranged in a metallic block (20),
    wherein the fuel transport channel (25) is designed to be at least partially meandering and the at least one heating element (31) is arranged in or on at least one cover plate (11a, 11b) of the metallic block (20),
    wherein the fuel transport channel (25) is incorporated into, milled into, or introduced into the metal block (22), and
    wherein the fuel transport channel (25) is arranged on a first side of the block (20), and in that the heating medium transport channel (26) is arranged on a second side of the block (20), which is in particular opposite the first side.

2. The preheating device (1) according to claim 1, wherein the block (20) comprises copper or consists of copper.

3. The preheating device (1) according to claim 1, wherein the fuel transport channel (25) is covered by the at least one cover plate (11a and/or 11b).

4. The preheating device (1) according to claim 1, wherein flow swirling means (21c, 22c) are arranged in the fuel transport channel (25).

5. The preheating device (1) according to claim 1, wherein the heating medium transport channel (26) is incorporated into, milled into, or introduced into the second side.

6. The preheating device (1) according to claim 1, wherein the heating medium transport channel (26) and the fuel transport channel (25) are each covered by a cover plate (11a and/or 11b).

7. The preheating device (1) according to claim 3, wherein the at least one cover plate (11a, 11b) is fixed to the block (20), in particular by welding.

8. The preheating device (1) according to claim 1, wherein flow swirling means (21c, 22c) are arranged in the heating medium transport channel (26).

9. The preheating device (1) according to claim 4, wherein the flow swirling means (21c, 22c) are designed as steps and/or projections.

10. The preheating device (1) according to claim 1, wherein the at least one heating element (31) is arranged on the at least one cover plate (11a) of the fuel transport channel (25).

11. The preheating device (1) according to claim 1, wherein the at least one heating element (31) is arranged on the surfaces of each of the at least one cover plate (11a, 11b), or is introduced into the surface of the at least one cover plate (11a, 11b).

12. The preheating device (1) according to claim 1, wherein the outer contour of the block (20) is approximately cuboid.

13. A vehicle comprising an engine, a fuel tank, fuel which is located in the fuel tank, a fuel supply system which supplies the fuel to the engine, and a preheating device (1) connected between the fuel tank and the engine,
    wherein the preheating device (1) comprises:
    a fuel transport device (22) having a fuel inlet (22a) and a fuel outlet (22b), and having a fuel transport channel (25) connecting the fuel inlet (22a) and the fuel outlet (22b);
    a heating medium transport device (21) having a heating medium inlet (21a) and a heating medium outlet (21b), as well as a heating medium transport channel (26) connecting the heating medium inlet (21a) and the heating medium outlet (21b); and/or
    at least one heating element (31),
    wherein the fuel transport device (22) and the heating medium transport device (21) and/or the at least one heating element (31) are in thermal contact with each other and thus form a heat exchanger via which a fuel transported in the fuel transport device (22) can be heated by a heating medium transported in the heating medium transport device (21), and/or by the at least one heating element (31), wherein the heating medium transport device (21) and the fuel transport device (22) are arranged in a metallic block (20), wherein the fuel transport channel (25) and the heating medium transport channel (26) are each designed to be meandering in the block (20), at least in sections, and in particular separated from each other in terms of flow, and/or in that the fuel transport device (22) is arranged in a metallic block (20), wherein the fuel transport channel (25) is designed to be at least partially meandering and the at least one heating element (31) is arranged in or on at least one cover plate (11a, 11b) of the metallic block (20), wherein the fuel transport channel (25) is incorporated into, milled into, or introduced into the metal block (22), and wherein the fuel transport channel (25) is arranged on a first side of the block (20), and in that the heating medium transport channel (26) is arranged on a second side of the block (20), which is in particular opposite the first side, wherein the fuel inlet (22a) of the preheating device (1) is connected to a line section leading to the fuel tank, and a fuel outlet (22b) of the preheating device (1) is connected to a line section leading to the engine, and wherein a heating medium is circulated through the heating medium transport device (21), and/or at least one heating element (31) is operated.

14. The vehicle according to claim 13, wherein the fuel is a fluid fuel, in particular diesel fuel.

15. The vehicle according to claim 13, wherein the heating medium is a fluid, in particular water.

16. The vehicle according to claim 13, wherein the at least one heating element is operated electrically.

17. The vehicle according to claim 13, wherein the vehicle is a watercraft, especially a ship.

* * * * *